United States Patent [19]
Casper

[11] Patent Number: 6,149,204
[45] Date of Patent: Nov. 21, 2000

[54] REGISTRATION-DECAL FORM WITH PROTECTIVE PATCH

[75] Inventor: Mark S. Casper, Williamsville, N.Y.

[73] Assignee: Moore U.S.A. Inc., Grand Island, N.Y.

[21] Appl. No.: 09/132,142

[22] Filed: Aug. 10, 1998

[51] Int. Cl.[7] .................................................. B42D 15/00
[52] U.S. Cl. ........................ 283/81; 283/91; 283/107; 283/109
[58] Field of Search .................... 283/107, 109, 283/81, 79, 91, 92

[56] References Cited

U.S. PATENT DOCUMENTS

| | | | |
|---|---|---|---|
| 2,324,885 | 7/1943 | Sherrill | 283/21 |
| 3,152,950 | 10/1964 | Palmquist et al. . | |
| 4,064,285 | 12/1977 | Mammino . | |
| 4,066,802 | 1/1978 | Clemens . | |
| 4,082,873 | 4/1978 | Williams . | |
| 4,172,163 | 10/1979 | Magnotta | 428/40 |
| 4,172,753 | 10/1979 | Benoit . | |
| 4,180,929 | 1/1980 | Schultz, Jr. . | |
| 4,303,461 | 12/1981 | La Mers . | |
| 4,308,310 | 12/1981 | Arnold et al. . | |
| 4,400,419 | 8/1983 | Laczynski . | |
| 4,426,422 | 1/1984 | Daniels | 428/352 |
| 4,428,997 | 1/1984 | Shulman . | |
| 4,517,044 | 5/1985 | Arnold . | |
| 4,522,864 | 6/1985 | Humason et al. . | |
| 4,542,288 | 9/1985 | Drexler | 235/487 |
| 4,584,238 | 4/1986 | Gen et al. | 428/349 |
| 4,599,129 | 7/1986 | Kerwin . | |
| 4,656,078 | 4/1987 | Goto et al. . | |
| 4,983,436 | 1/1991 | Bailey et al. | 350/105 |
| 5,042,842 | 8/1991 | Green et al. | 283/101 |
| 5,104,471 | 4/1992 | Antes et al. . | |
| 5,267,755 | 12/1993 | Yamauchi et al. | 283/86 |
| 5,318,816 | 6/1994 | Yin et al. . | |
| 5,346,259 | 9/1994 | Mocilnokar et al. | 283/108 |
| 5,381,618 | 1/1995 | Singleton . | |
| 5,413,532 | 5/1995 | Raby . | |
| 5,484,502 | 1/1996 | Bozanic . | |
| 5,508,105 | 4/1996 | Orensteen et al. | 428/323 |
| 5,601,682 | 2/1997 | Longtin | 156/272.2 |
| 5,702,127 | 12/1997 | Korondi, Jr. . | |
| 5,869,160 | 2/1999 | Mason et al. | 428/40.2 |

*Primary Examiner*—Andrea L. Pitts
*Assistant Examiner*—Monica Smith Carter
*Attorney, Agent, or Firm*—Nixon & Vanderhye P.C.

[57] ABSTRACT

A decal having a body of readily tearable material and a reflective material first face has first, toner, indicia on the first face circumscribing a first area, and second indicia outside of the first area. A protective substantially transparent plastic (e.g. acrylic or polyester) thin (e.g. about 0.001–0.002 inches) film substantially covers the first indicia (and has an area not greater than about 130% of the first area) and protects the first indicia but does not significantly increase the tear resistance of the decal body. The protective film is held to the decal with an aggressive adhesive so that the decal will tear if removable of the protective film is attempted. The protective film may be applied either manually or automatically, and the decal is part of a business form (e.g. a mailer type business form) which has toner indicia on it substantially identical to the first indicia, imaged at substantially the same time using a laser printer.

20 Claims, 6 Drawing Sheets

FIG.8

REGISTRATION-DECAL FORM WITH PROTECTIVE PATCH

BACKGROUND AND SUMMARY OF THE INVENTION

There are a number of situations in which it is desirable to image decals using toner (e.g. as by application using a conventional laser printer) so that the decal and a business form on which the decal is mounted may both have the same identifying indicia thereon. This is especially significant for vehicle registration decal renewals such as printed by state governments or other organizations. It is highly desirable to be able to use laser printers, or like toner base printers, to image a registration form (which typically is carried in the glove compartment of the vehicle) and license plate decal simultaneously, such at a branch office of a state department of motor vehicles, to guarantee matching numbers on the decal and registration form. Such decals are made so that they tear easily so that anyone attempting to remove a decal from a license plate will destroy the decal. The decals typically are of reflective material, incorporating glass bead reflective properties therein so as to be visible at night.

While the use of laser printers for substantially simultaneously printing registration forms and license plate decals is highly desirable, a disadvantage associated therewith is that the powdered toner used by the printer is easily removed from the decal either as a result of encountering certain environmental conditions, or certainly if someone is interested in forgery. While the decal has a toner receptive surface and the toner is resistant to some environmental substances that it will come into contact with (such as some detergents and salt water), most toners do not stand up to a variety of other environmental or like conditions or agents. Particularly difficult are cleaning agents such as turpentine and gasoline which can fairly readily remove toner.

According to the present invention, the problems associated with toner on decals is overcome by utilizing a small size substantially transparent plastic protective patch which covers the toner applied indicia on the decal. While the patch protects the toner from cleaning agents, etc., does not significantly retard the decal light reflective properties, and it does not significantly increase the tear strength of the decal, so that the decal will still readily tear if an attempt is made to remove it from the license plate. Also the adhesive used to bond the substantially transparent protective patch to the decal is aggressive, so that any attempt to remove the protective patch will also destroy the decal. The protective patch is utilized according to the invention may readily be applied either manually or automatically to the toner indicia on the decal, providing a simple yet highly effective mechanism and procedure for overcoming the problem associated with utilizing toner based indicia on decals in prior art business forms.

According to one aspect of the present invention, a reflective decal is provided comprising the following components: A decal substrate body of readily tearable material, having a reflective material first face visible when in use, and having a decal area. A second face of the decal body opposite the first face, and having adhesive associated therewith. First, toner, indicia on the first face, the first toner indicia circumscribing a first area, the first area less than the decal area. Second indicia on the first face distinct from the first indicia and outside the first area. And, a protective substantially transparent film substantially covering the first indicia and protecting the first indicia but not significantly increasing the tear resistance of the decal body [so that the decal will still readily tear if an attempt is made to remove it from the license plate].

The protective transparent film is preferably attached to the decal body over the first toner indicia with a substantially transparent aggressive pressure sensitive adhesive, such as a permanent thermoset acrylic copolymer adhesive. The transparent protective film may comprise a clear acrylic film, polyester film, or another plastic film having protective and tear properties substantially comparable to acrylic and polyester, having a thickness of about 0.001–0.002 inches. When it has that thickness then it has sufficient integrity to be effectively applied to the toner indicia and protect it, but yet it will be destroyed if removable is attempted.

The decal body typically comprises a metal foil, and the first face comprises one or more layers of reflective glass beads and polymer overcoating. The decal second face adhesive preferably comprises pressure sensitive adhesive, and the decal may be applied to a license plate with the second face pressure sensitive adhesive, and initially is applied to a business form release material section by that adhesive. The business form has toner indicia thereon spaced from the first indicia but substantially identical thereto. For example the second indicia may comprise an expiration date, while the first indicia comprises identifying indicia (a license plate or registration number). Typically the first area is less than 50% of the decal area (more preferably less than a third of the decal area) and the protective film preferably has an area not more than about 30% greater than the first area (e.g. about 10–30% greater).

According to another aspect of the present invention a business form is provided comprising the following components: A substrate body having a piggyback decal attached thereto, the decal having a decal area, and a first, top, face having first toner, indicia on the first face, the first toner indicia circumscribing a first area, the first area less than the decal area. Second indicia on the decal first face distinct from the first indicia and outside the first area. Third toner indicia on the substrate body distinct from the decal, the third toner indicia substantially identical to the first toner indicia. And, a protective substantially transparent film adapted to substantially cover the first indicia and having an area not greater than about 130% of the first area, the film for protecting the first indicia but not significantly increasing the tear resistance of the decal body.

The business form preferably further comprises a patch of pressure sensitive adhesive release material on the substrate body spaced from the decal, and an aggressive substantially transparent pressure sensitive adhesive on the protective film, the aggressive adhesive on the patch of release material. The protective film is applied over and covers the first area, and is preferably attached to the decal with substantially transparent aggressive adhesive as described above, and is formed of materials and has a thickness preferably as described above. The substrate body may be part of a continuous form set, attached to other like business forms by lines of weakness (such as perforation lines, tear lines, die cut lines, etc.). The substrate body may comprise a mailer type business form including adhesive or cohesive strips and at least one fold line, for folding into a mailer, and a permanent (until next renewal) registration card section.

According to another aspect of the present invention a method of facilitating (making and/or using) a business form from a substrate, at least one readily tearable decal, and substantially transparent protective film, is provided. The method comprises: (a) Applying the at least one readily tearable decal in piggyback fashion to the business form substrate. (b) Toner imaging first indicia on a portion of the decal so that the first indicia circumscribes a first area, and substantially simultaneously toner imaging the first indicia on the substrate spaced from the decal. And, (c) applying the protective substantially transparent film covering the first indicia over the first area so that the film protects the first indicia but does not significantly increase the tear resistance of the decal.

Preferably (c) is practiced automatically; for example (c) is practiced by: (c1) providing the protective film as a plastic film in patch form having a thickness of between about 0.001–0.002 inches attached by an aggressive substantially transparent pressure sensitive adhesive to a release material substrate; (c2) automatically separating the film from the release material substrate above the business form; and (c3) automatically blowing the film down onto the decal so that the aggressive adhesive holds the film onto the decal covering the first indicia.

The method may further comprise: providing the protective film as a plastic film in patch form having a thickness of between about 0.001–0.002 inches attached by an aggressive substantially transparent adhesive on a release material patch on the business form; and in which case (c) is practiced by manually removing the protective film patch from the release material on the business form, and applying the protective film patch over the first indicia on the decal so that the aggressive adhesive holds the protective film patch on the decal.

It is the primary object of the present invention to provide a simple yet effective reflective decal which can be easily produced using toner indicia or registration indicia thereon without the toner indicia being readily removed by environmental or human forgery conditions in the field. This and other objects of the invention will become clear from an inspection of the detailed description of the invention and from the appended claims.

DETAILED DESCRIPTION OF THE DRAWINGS

Figure 1:
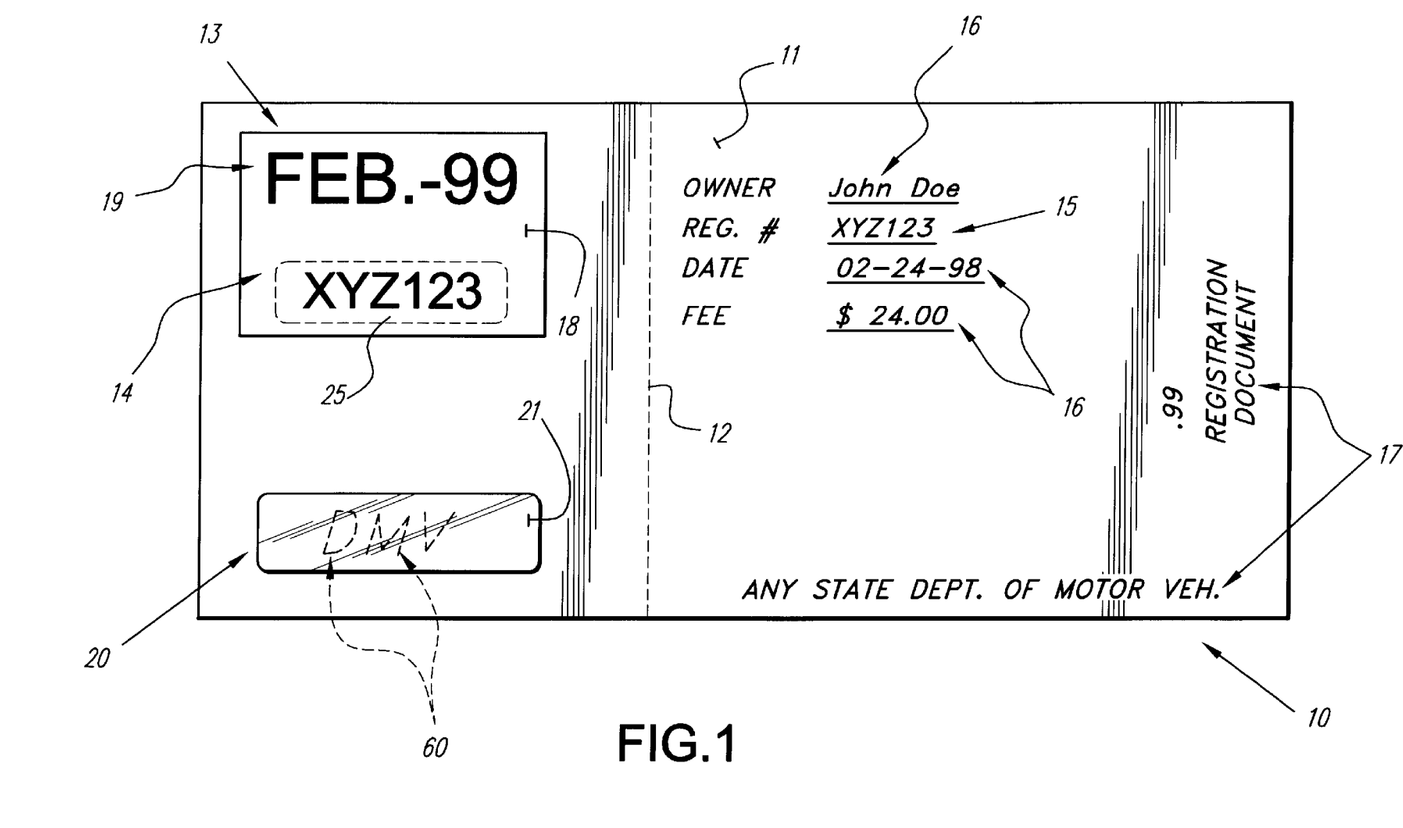
FIG. 1 is a top plan view of an exemplary business form according to the present invention prior to the application of a protective patch onto toner decal indicia thereon.

FIG. 1 schematically illustrates an exemplary business form 10 according to the present invention. Except as will be hereinafter described, the form 10 is basically of conventional construction, having a paper substrate 11 which may be segmented into a number of sections by one or more lines of weakness (e.g. perforation lines) 12, and having a conventional piggyback decal assembly 13 applied thereto. The decal assembly 13 has first toner indicia 14 on top surface (18) thereof, which indicia 14 is preferably applied by a laser printer or like toner imaging device, which prints the indicia 14 (which may a license plate or registration number) substantially simultaneously with printing the license or registration indicia 15 on the substrate 11 (on the opposite side of the lines of weakness 12). That is it is desirable to print the indicia 14, 15 with a laser printer or like toner imaging system on the same pass through the laser printer or the like so that the indicia 14, 15 are sure to properly correspond. Of course other variable indicia, indicated generally by reference numeral 16 in FIG. 1, is also imaged by the laser printer or the like at the same time, and non-variable indicia, 17, may have been preprinted on the substrate 11, or also be printed at the same time as the variable indicia 14–16.

As is also conventional, the decal assembly 13 also has on the top face 18 thereof, in addition to the toner indicia 14, second indicia 19. The second indicia 19, which in the case of a motor vehicle registration decal is typically expiration date indicia, e.g. month and year, only a month if another year decal is provided, or only a year. The indicia 19 typically is applied by other techniques aside from using toner imaging, which techniques should result in a more permanent image, e.g. during manufacture of the decal assembly 13. As is conventional, preferably the decal assembly 13 comprises a metal foil body (27) with the first (top) face 18 thereof comprising one or more layers of reflective glass beads, with a polymer overcoating.

What has heretofore been described is conventional. Improvements according to the present invention, which allow protection of the indicia 14 from environmental or other conditions or materials (such as turpentine, gasoline, or the like) while still not adversely affecting the ready tear characteristics of the conventional decal body of assembly 13 (made readily tearable so that it will shred when removable is attempted, to prevent theft or forgery), include the provision of the protective patch assembly 20 illustrated in FIGS. 1 and 2.

The protective patch assembly 20 preferably is applied, using standard techniques, as a piggyback assembly onto the substrate 11 on the same side of the line of weakness 12 as the decal piggyback assembly 13. As seen most clearly in FIG. 2, with the thicknesses of the layers greatly exaggerated for clarity of illustration, the clear patch piggyback assembly 20 comprises a substantially transparent film 21 as the top layer, having a highly aggressive substantially transparent adhesive 22 on the bottom face thereof, and the adhesive 22 engaging an adhesive-release lining material 23 which in turn is adhesively secured to the substrate 11. When the film 21 is removed from the form 10, the adhesive 22 stays with the film 21 and separates from the release material 23.

Figure 2:
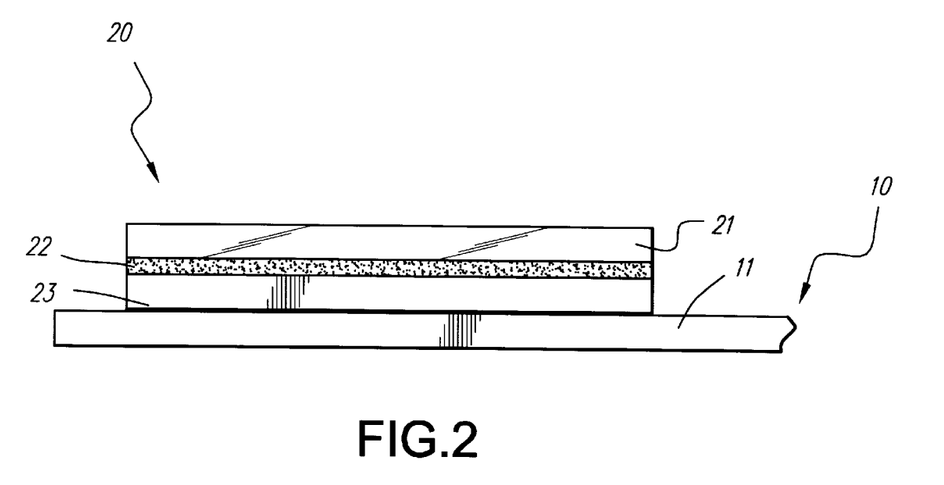
FIG. 2 is a side schematic view of the form of FIG. 1 with the thickness of the layers shown greatly exaggerated for simplicity of illustration, and showing the protective patch on the form of FIG. 1.

The film 21 preferably is a plastic film which has properties which allow it to protect toner (14) from cleaning agents such as turpentine or gasoline, or the like, and/or other materials and environmental conditions. However the material 21 itself, and especially in view of its thinness, does not significantly increase the tear resistance of the decal 13 when applied thereto, and because the adhesive 22 is aggressive if removal of the film 21 is attempted once the adhesive 22 engages the decal surface 18, the film 21 and its underlying decal will shred or will otherwise be destroyed, so that it is not feasible to forge the decal 13. In the preferred embodiment, the film 21 comprises a clear acrylic or polyester film (or another plastic film having protective and tear properties substantially comparable to acrylic and polyester), having a thickness of between about 0.001–0.002 inches. The adhesive 22 is preferably (although there are a wide variety of alternatives) a permanent thermoset acrylic copolymer pressure sensitive adhesive, such as "Flexcon V122" trade name adhesive.

Note that the toner indicia 14 circumscribes a first area, as indicated schematically by the dotted line 25 in FIG. 1. This area 25 is less than the area of decal 13, and preferably is less than half of the decal area, and more preferably less than a third of the decal area. The film 21 has an area that is preferably just enough larger than the first area 21 so that it is feasible, or easy, to apply the film 21 so that it substantially completely covers the first area 25, but not enough larger than the area 25 so that a significant tear resistance function is imparted by the film 21 to the decal body (27) of assembly 13. In the preferred embodiment the maximum area of the film 21 is about 130% of the first area 25, and preferably the area of the film 21 is about 10–20% greater than the first area 25.

Figure 3:
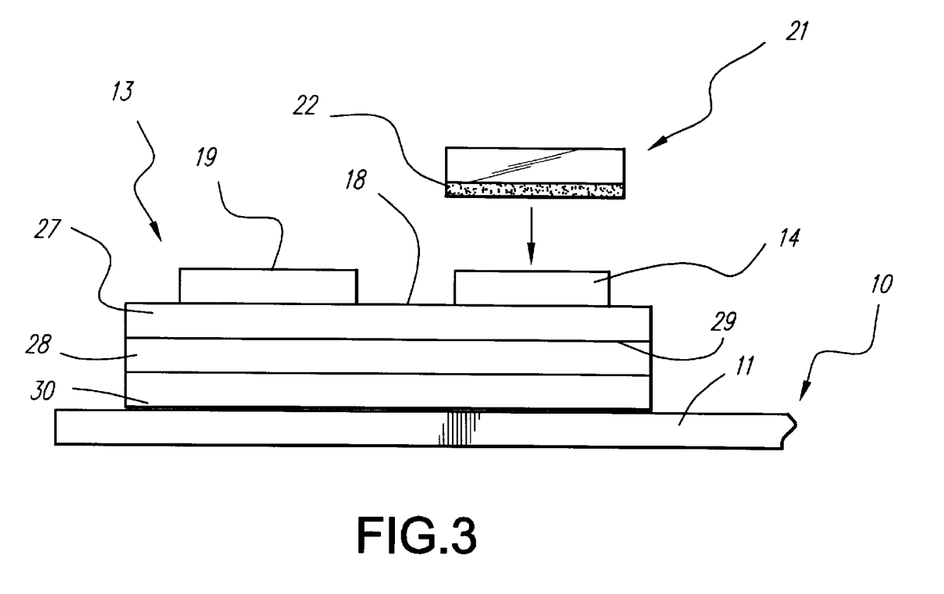
FIG. 3 is a schematic view like that of FIG. 2 only showing the decal portion of the form of FIG. 1 with the protective patch about to be applied thereto, and again showing the layers of greatly exaggerated thickness to facilitate illustration thereof.

FIG. 3 schematically illustrates the film 21 being applied over the first indicia 14. The layers illustrated in FIG. 3 for the decal piggyback assembly 13—which again are greatly enlarged for clarity of illustration—include the decal body 27 of readily tearable material (such as metal foil as described above) with a reflective surface 18 (also as is conventional, such as one or more layers of glass beads also as described above), having an adhesive 28 on the face 29 of the body 27 opposite the first (top) face 18, and a release liner 30 adhesively secured to the substrate 11. The adhesive 28 preferably is a permanent pressure sensitive adhesive, one which will adhere to a metal vehicle license plate, or to an earlier decal which has been applied to the license plate, or a wide variety of other surfaces. When the decal body 27 is removed from the substrate 11, the adhesive 28 releases from the release material 30 and is removed with the body 27, and then the adhesive 28 is placed into contact with a license plate or the like.

Utilizing the business form 10 of FIGS. 1–3, the preferred manner of applying the protective film 21 to the indicia 14 is manually. That is after imaging of the business form 10, a motor vehicle department employee or contractor manually separates the film 21 from the release material 23, and places the adhesive 22 into contact with the surface 18 so that the film 21 substantially completely covers the indicia 14.

Figure 4:
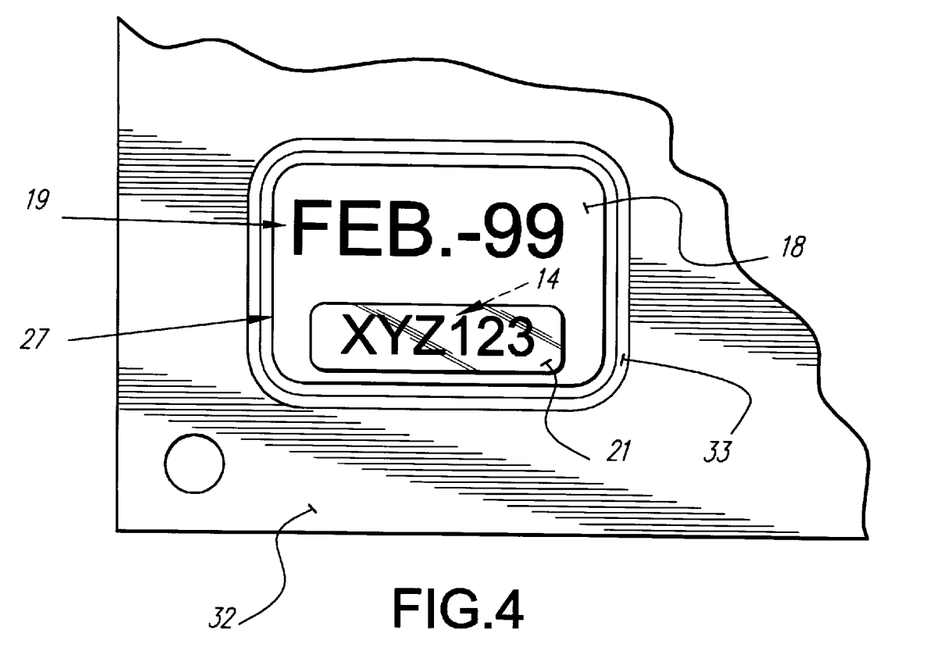
FIG. 4 is a top schematic view of the decal of the form of FIGS. 1 and 3 applied to a vehicle license plate.

FIG. 4 schematically illustrates the application of a decal body 27 onto a motor vehicle license plate 32. Typically the adhesive 28 is applied to a pre-formed area 33 of the license plate 32, elsewhere on the license plate 32 there being a license plate indicia. The decal body 27 is applied by the vehicle owner when the business form 10 is sent in the mail, or hand delivered, to the vehicle owner. After applying the decal body 27 the vehicle owner will preferably remove the section of the business form 10 to the left of the line of weakness 12 and discard it, and place the section to the right of the line of weakness 12 in his or her glove compartment in the vehicle having the license plate 32.

While the form 10 is shown only with one decal assembly 13 associated therewith, it may just as readily be practiced utilizing two (or even more) decal assemblies 13 and/or protective patch assemblies 20. Having one, two, or four decal assemblies 13 and protective patch assemblies 20 are the most common.

Figure 5:
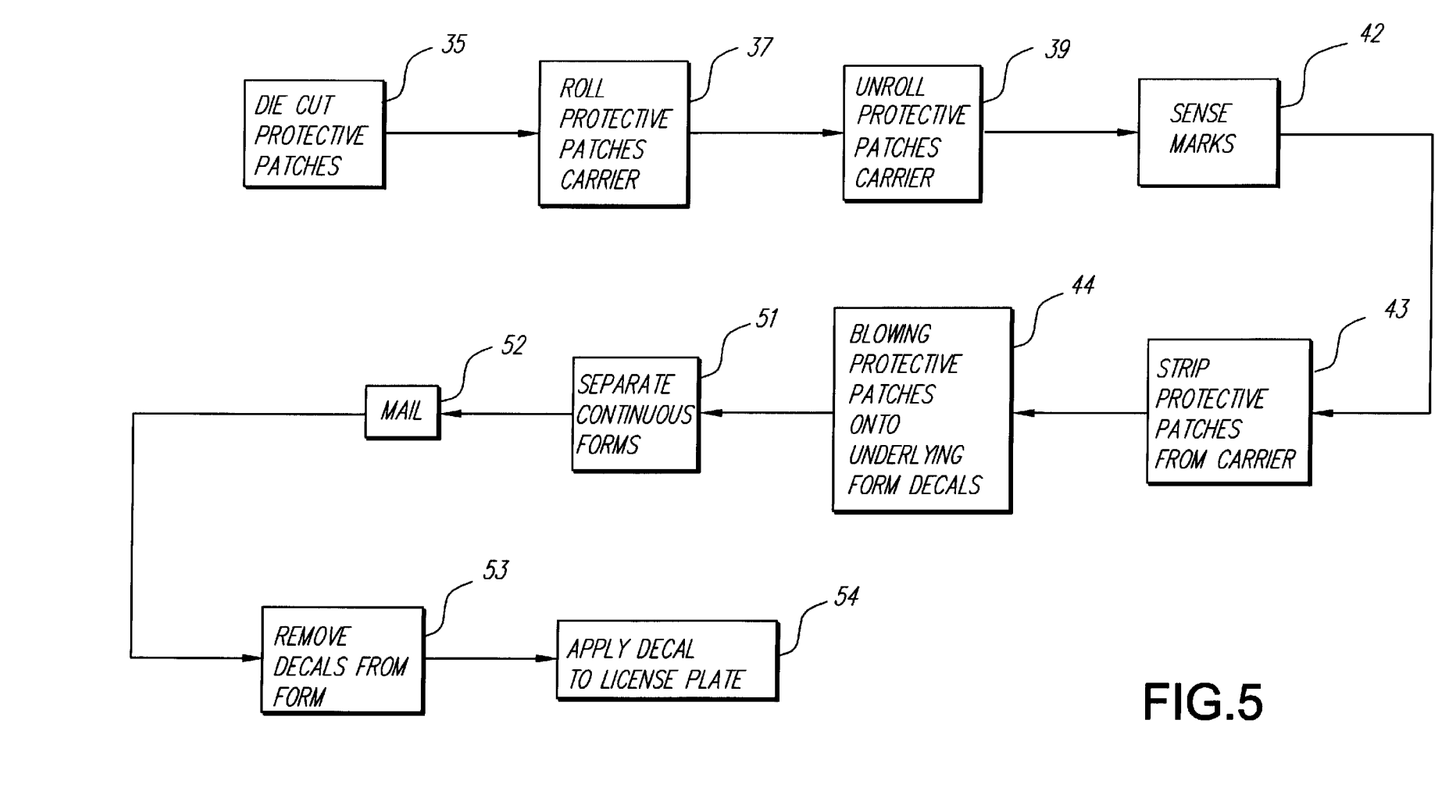
FIG. 5 is a box diagram illustrating various method steps that may be employed in the practice of an exemplary method according to the present invention for automatically applying the protective film to the decal toner indicia.

FIG. 5 schematically illustrates a method of facilitating (making and using) a business form from a substrate like the substrate 11, a readily tearable decal body like the body 27, and a substantially transparent protective film like the film 21, in which the protective film is automatically applied to the first indicia area of the decal. FIG. 5 relates to the structures and other schematics illustrated in FIGS. 6 through 8. In the FIGS. 5 through 8 embodiment structures comparable to those in the FIGS. 1 through 4 embodiment are shown by the same reference numeral only preceded by a "1". The ultimate product obtained (that is the final decal with protective film) in the FIGS. 5 through 8 embodiment is essentially identical to that obtained from the FIGS. 1 through 3 embodiment (e.g. as illustrated in FIG. 4).

Figure 6:
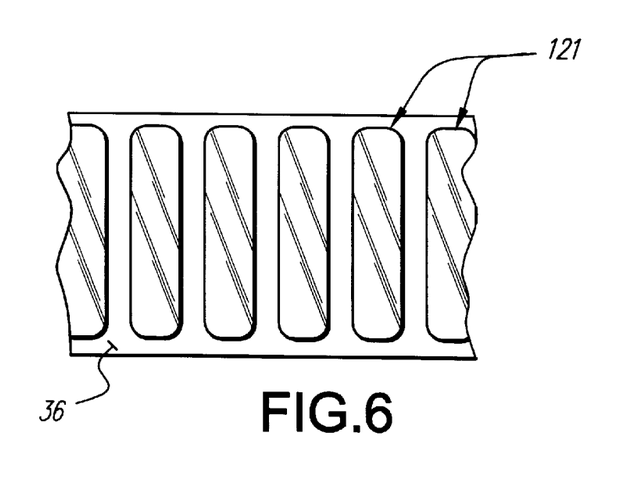
FIG. 6 is a top schematic view of a substrate containing protective film patches used in the method of FIG. 5.
Figure 7:
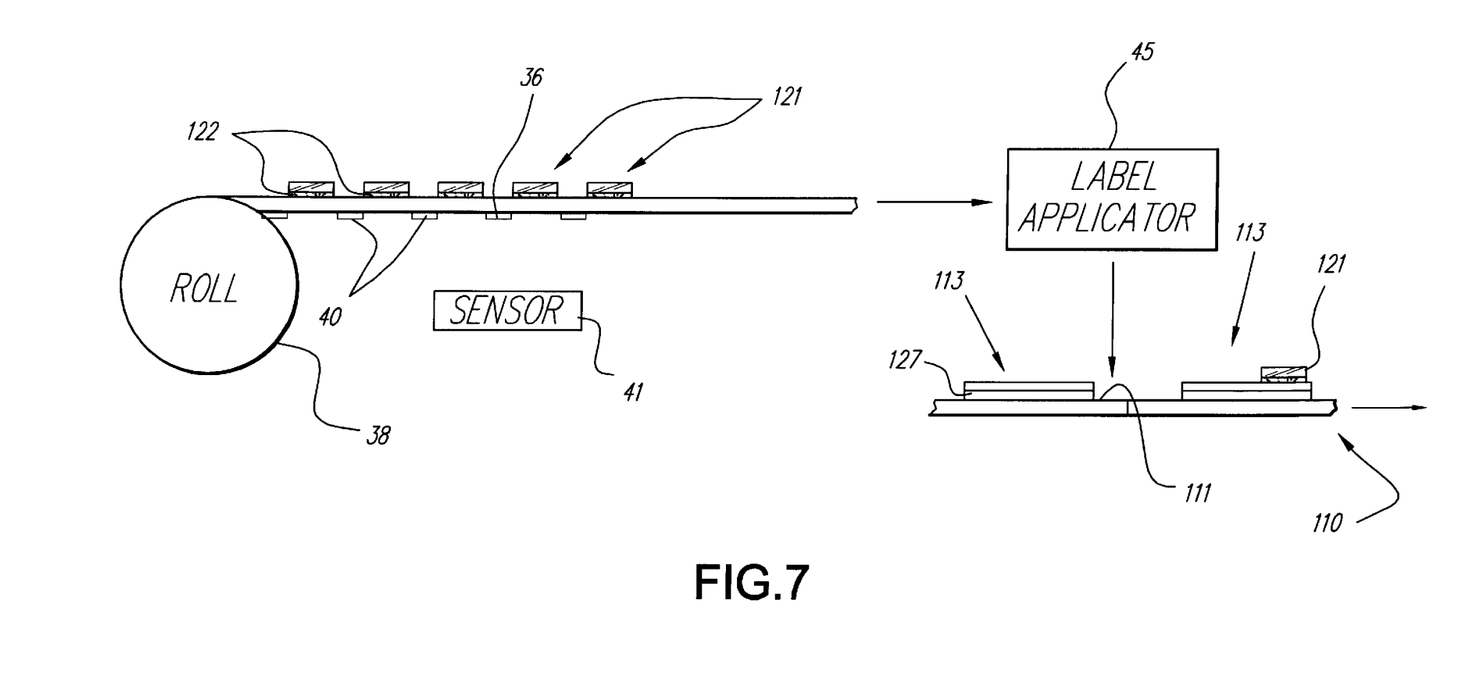
FIG. 7 is a side schematic view illustrating the use of the substrate of FIG. 6 with conventional equipment to apply protective films onto the decal toner.

The first step in the automated procedure of FIG. 5 is to die cut the protective patches 121 (see FIGS. 6 and 7), as schematically illustrated at 35 in FIG. 5, from a substrate 36 of release material, having a clear plastic film 121 held thereto by the adhesive 122. The top and side views of this arrangement are seen in FIGS. 6 and 7, the thickness being greatly exaggerated in FIG. 7 for clarity of illustration. After the patches 121 are die cut they are rolled up as indicated at 37 in FIG. 5, to form the roll 38 of FIG. 7, and at the application station (to which they are typically shipped) they are unrolled as indicated at 39 in FIG. 5, FIG. 7 illustrating the unrolling operation. The substrate 36 is also provided so that it has sensor marks 40 on the bottom of the substrate 36. The sensor marks 40 are sensed by any suitable conventional sensor 41 (see FIG. 7) for that purpose to ensure alignment of the protective patches 121 with the decals to which they are applied. The mark sensing step is illustrated schematically at 42 in FIG. 5.

Figure 8:
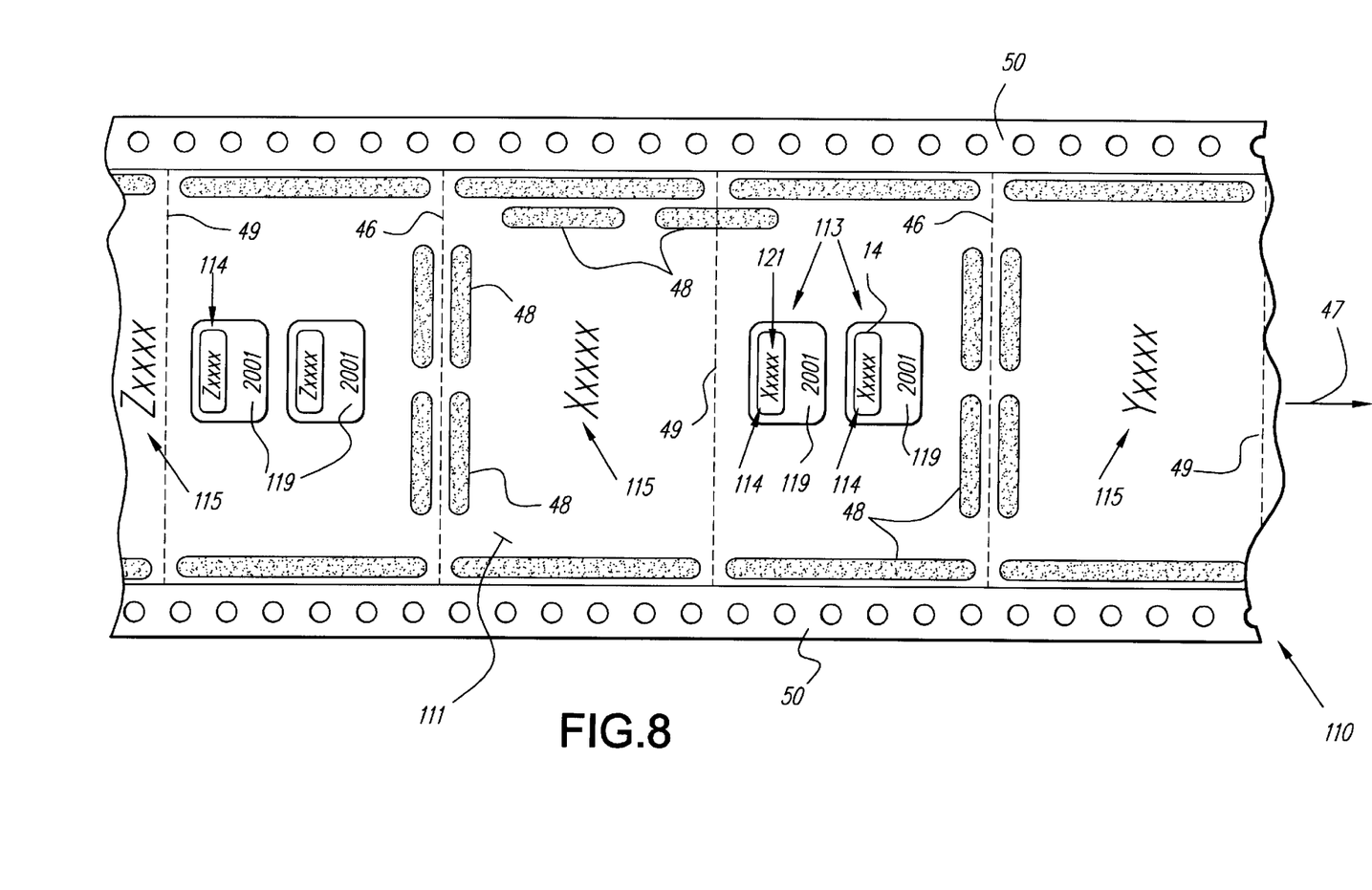
FIG. 8 is a schematic top plan view of continuous form mailer type business forms according to the invention having decals thereon onto which protective plastic film patches have been applied pursuant to the procedure of FIGS. 5 and 7.

The next step in the procedure of FIG. 5 is stripping the protective patches 121 from the carrier 36, as indicated at 43, and then blowing the protective patches 121 onto the underlying form decal assemblies 113 as indicated by box 44 in FIG. 5 and as schematically illustrated in FIGS. 7 and 8. The separation and blowing are accomplished utilizing a conventional label applicator as illustrated schematically at 45 in FIG. 7. For example the label applicator 45 may be a Willet model #230S. The left side of the substrate 111 in FIG. 7 shows the decal assembly 113 before the protective patch 121 is applied using the label applicator 45, while the right hand decal assembly 113 shows the patch 121 applied. Note that additional sensor marks (like marks 40) may be provided on the substrate 111 to be sensed by another sensor similar to the sensor 41, if necessary to ensure proper alignment.

In the embodiment illustrated in FIGS. 7 and 8, the business forms 110 are in continuous format, the individual forms 110 being mailer type business forms which are separated from each other by lines of weakness (such as perforation lines) 46 substantially perpendicular to the direction of movement 47 of the forms 110 during processing. The mailer type business forms 110 may be any conventional type, which have strips of adhesive or cohesive 48 which cooperate with each other when the form 110 is folded about one or more fold lines 49. The mailers may be conventional Z-fold, eccentric Z-fold, C-fold, eccentric C-fold, V-fold, or any other conventional type mailer. The continuous forms 110 also have tractor drive strips 50 which ensure proper feeding thereof (and timing with proper cooperation with the label applicator 45), which tractor drive strips 50 are slit off before the final mailer is sent out, as is conventional.

FIG. 8 shows mailer type business forms 110 each with two decal assemblies 113 thereon. Note that the indicia 114, 115 differs from one form 110 to the next, although the indicia 119 remains the same, and the indicia 114, 115, on any particular form is the same. The next step in the handling of the forms 110, after automatic application of the patches 121 over the toner imaging 114, is to separate the continuous forms into individual forms 110 as illustrated schematically at 51 in FIG. 5. Separation is typically accomplished utilizing a burster or other conventional equipment, the individual forms 110 being separated at the lines of weakness 46. Then the forms are readied for mailing (the forms 10 of FIG. 1 being inserted into envelopes, the forms 110 being folded and sealed using conventional folding and sealing equipment), and then mailed or otherwise delivered (e.g. by hand at a local DMV office) as indicated schematically at 52 in FIG. 5. The recipient then removes the one or more decal assemblies 13, 113 from the forms 10, 110, as illustrated at 53 in FIG. 5, and applies the decal bodies 27, 127 to a license plate 32, as illustrated schematically at 54 in FIG. 5, and as seen in FIG. 4.

If desired, the film 21, 121 and/or decal top surface 18, may be provided with other mechanisms to minimize effective forgery. For example the film 21 can have a hologram—shown schematically at 60 ("DMV") in FIG. 1—or other conventional security features to further discourage attempts at duplication.

It will thus be seen that according to the present invention a simple yet effective reflective decal, a business form containing one or more decals, and a method of facilitating (making and using) a business form having a substrate, at least one readily tearable decal, substantially transparent protective film. While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims to encompass all equivalent products, forms, and methods.

What is claimed is:

1. A reflective decal comprising:
    a decal substrate body of readily tearable material, having a reflective material first face visible when in use, and having a decal area;
    a second face of said decal body opposite said first face, and having adhesive associated therewith;
    first, toner, indicia on said first face, said first toner indicia circumscribing a first area, said first area less than said decal area;
    second indicia on said first face distinct from said first indicia and outside said first area; and
    a protective substantially transparent film substantially covering said first indicia and protecting said first indicia but not significantly increasing the tear resistance of said decal body.

2. A reflective decal as recited in claim 1 wherein said protective transparent film is attached to said decal body over said first toner indicia with a substantially transparent aggressive pressure sensitive adhesive.

3. A reflective decal as recited in claim 2 wherein said protective transparent film comprises clear acrylic film, polyester film, or another plastic film having protective and tear properties substantially comparable to acrylic and polyester, having a thickness of between about 0.001–0.002 inches.

4. A reflective decal as recited in claim 3 wherein said aggressive transparent adhesive comprises a permanent thermoset acrylic copolymer pressure sensitive adhesive.

5. A reflective decal as recited in claim 3 wherein said decal body comprises a metal foil, and wherein said first face comprises one or more layers of reflective glass beads and polymer overcoating.

6. A reflective decal as recited in claim 5 wherein said decal second face adhesive comprises pressure sensitive adhesive, and wherein said decal is applied to a vehicle license plate with said second face pressure sensitive adhesive.

7. A reflective decal as recited in claim 5 wherein said decal second face adhesive comprises pressure sensitive adhesive, and wherein said decal is applied to a release material section of a business form by said second face adhesive, and wherein said business form has toner indicia thereon spaced from said first indicia but substantially identical thereto.

8. A reflective decal as recited in claim 6 wherein said second indicia comprises expiration date indicia, and said first indicia comprises identifying indicia, and wherein said first area is less than 50% of said decal area.

9. A reflective decal as recited in claim 1 wherein said protective film has an area not more than about 30% greater than said first area.

10. A business form comprising:
    a substrate body having a piggyback decal attached thereto, said decal having a decal area, and a first, top, face having first toner, indicia on said first face, said first toner indicia circumscribing a first area, said first area less than said decal area;
    second indicia on said decal first face distinct from said first indicia and outside said first area;
    third toner indicia on said substrate body distinct from said decal, said third toner indicia substantially identical to said first toner indicia; and
    a protective substantially transparent film adapted to substantially cover said first indicia and having an area not greater than about 130% of said first area, said film for protecting said first indicia but not significantly increasing the tear resistance of said decal body.

11. A business form as recited in claim 10 further comprising a patch of pressure sensitive adhesive release material on said substrate body spaced from said decal, and an aggressive substantially transparent pressure sensitive adhesive on said protective film, said aggressive adhesive on said patch of release material.

12. A business form as recited in claim 10 wherein said protective film is applied over and substantially covers said first area.

13. A business form as recited in claim 12 wherein said protective film is attached to said decal with a substantially transparent aggressive pressure sensitive adhesive.

14. A business form as recited in claim 10 wherein said substrate body is part of a continuous form set, attached to other like business forms by lines of weakness.

15. A business form as recited in claim 10 wherein said substrate body comprises a mailer type business form, including adhesive or cohesive strips and at least one fold line, for folding into a mailer, and a permanent registration card section.

16. A business form as recited in claim 10 wherein said protective transparent film comprises clear acrylic film, polyester film, or another plastic film having protective and tear properties substantially comparable to acrylic and polyester, having a thickness of between about 0.001–0.002 inches; and wherein said decal comprises a metal foil, and wherein said first face comprises one or more layers of reflective glass beads and polymer overcoating.

17. A method of facilitating a business form from a substrate, at least one readily tearable decal, and substantially transparent protective film, comprising:

(a) applying the at least one readily tearable decal in piggyback fashion to the business form substrate;

(b) toner imaging first indicia on a portion of the decal so that the first indicia circumscribes a first area, and substantially simultaneously toner imaging the first indicia on the substrate spaced from the decal; and (c) applying the protective substantially transparent film substantially covering the first indicia over the first area so that the film protects the first indicia but does not significantly increase the tear resistance of the decal.

18. A method as recited in claim 17 wherein (c) is practiced automatically.

19. A method as recited in claim 18 wherein (c) is practiced by: (c1) providing the protective film as a plastic film in patch form having a thickness of between about 0.001–0.002 inches attached by an aggressive substantially transparent pressure sensitive adhesive to a release material substrate; (c2) automatically separating the film from the release material substrate above the business form; and (c3) automatically blowing the film down onto the decal so that the aggressive adhesive holds the film onto the decal covering the first indicia.

20. A method as recited in claim 17 further comprising providing the protective film as a plastic film in patch form having a thickness of between about 0.001–0.002 inches attached by an aggressive substantially transparent adhesive on a release material patch on the business form; and wherein (c) is practiced by manually removing the protective film patch from the release material on the business form, and applying the protective film patch over the first indicia on the decal so that the aggressive adhesive holds the protective film patch on the decal.

* * * * *